United States Patent [19]

Jones et al.

[11] Patent Number: 4,873,132
[45] Date of Patent: * Oct. 10, 1989

[54] SURFACE PROTECTOR WITH EXPANSIBLE POCKET

[75] Inventors: Wallace R. Jones, Waite Hill Village; Robert A. Isaksen, Chardon, both of Ohio

[73] Assignee: The Excello Specialty Company, Cleveland, Ohio

[*] Notice: The portion of the term of this patent subsequent to Sep. 29, 2004 has been disclaimed.

[21] Appl. No.: 98,805

[22] Filed: Sep. 21, 1987

Related U.S. Application Data

[63] Continuation of Ser. No. 883,826, Jul. 9, 1986, Pat. No. 4,696,848.

[51] Int. Cl.⁴ .............................................. B32B 3/02
[52] U.S. Cl. ..................................... 428/80; 428/182
[58] Field of Search ................ 428/80, 174, 182, 192, 428/194, 195, 179, 343; 427/208.4, 208.6, 322, 275

[56] References Cited

U.S. PATENT DOCUMENTS

| | | | |
|---|---|---|---|
| 2,095,776 | 10/1937 | Von Hoffe et al. | 91/68 |
| 2,111,168 | 3/1938 | Chansor | 92/104 |
| 2,824,920 | 2/1958 | Humphreys | 92/104 |
| 2,829,728 | 4/1958 | Brown | 181/149 |
| 3,684,642 | 8/1972 | Rogers, Jr. | 428/182 |
| 4,090,582 | 5/1978 | Deschu | 181/150 |
| 4,161,995 | 7/1979 | Pohlmann et al. | 181/149 |
| 4,201,612 | 5/1980 | Figge et al. | 156/224 |
| 4,420,520 | 12/1983 | Jones et al. | 428/194 |
| 4,469,732 | 9/1984 | Isaksen et al. | 428/194 |
| 4,544,593 | 10/1985 | Borgert et al. | 428/174 |
| 4,588,627 | 5/1986 | Isaksen et al. | 428/80 |
| 4,604,302 | 8/1986 | Isaksen et al. | 427/208.6 |
| 4,696,848 | 9/1987 | Jones et al. | 428/80 |

FOREIGN PATENT DOCUMENTS

2409669  6/1979  France.

OTHER PUBLICATIONS

J. C. Whitney & Co. Cat. No. 451B, p. 18, undated.

Primary Examiner—Paul J. Thibodeau
Attorney, Agent, or Firm—Fay, Sharpe, Beall, Fagan, Minnich & McKee

[57] ABSTRACT

A protector article and method of forming the same for use as a paint mask or water shield. The article comprises a generally flat and relatively thin sheet of flexible plastic material having its peripheral edge shaped to conform to the shape of the surface to be protected. Adhesive is carried by the peripheral edge of the sheet to allow it to be permanently or temporarily connected to the surface to be protected. At least one predetermined area in the sheet is enclosed by a series of relatively small and closely spaced corrugations to allow the enclosed area(s) to be selectively deflected laterally of the plane of the sheet to form pockets or bulges to allow the sheet to generally conform to discontinuities in the surface being protected. The corrugations are preferably formed by conventional thermoforming techniques.

9 Claims, 2 Drawing Sheets

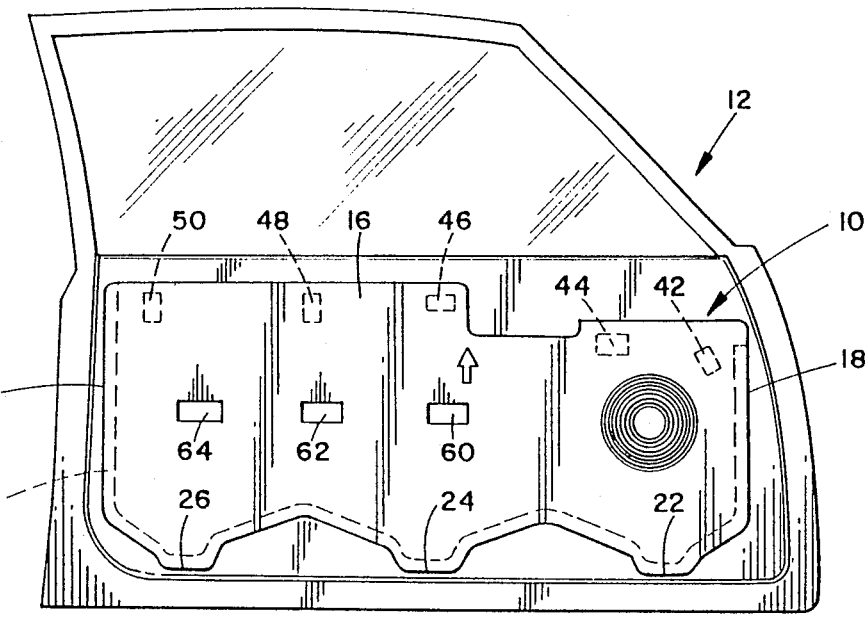
FIG. 3
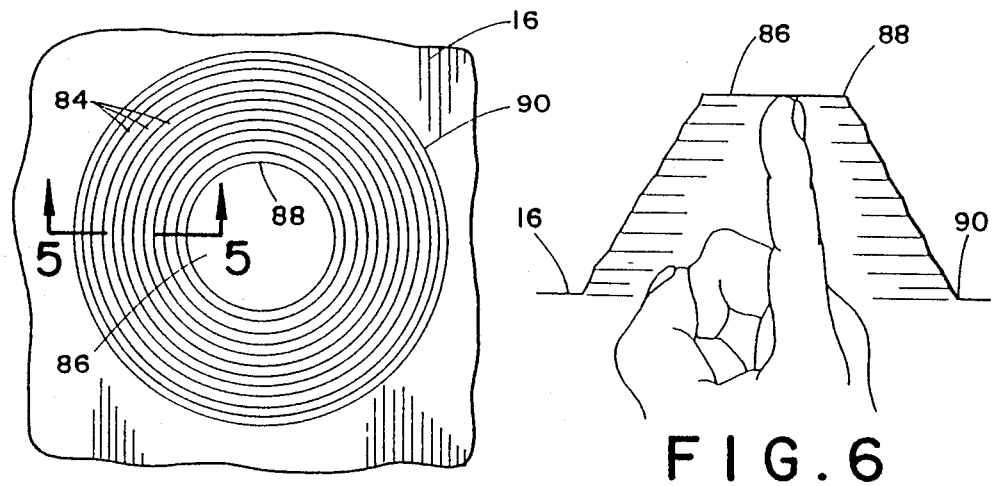
FIG. 4
FIG. 6
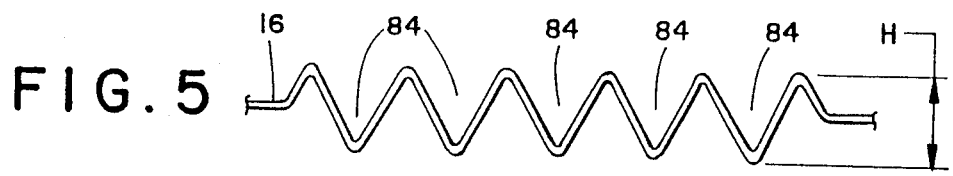
FIG. 5

SURFACE PROTECTOR WITH EXPANSIBLE POCKET

This application is a continuation, of application Ser. No. 883,826, filed July 9, 1986, now U.S. Pat. No. 4,696,848.

BACKGROUND OF THE INVENTION

The subject invention is directed to a shield device and method of forming the same. The invention is especially suited for use as a water deflector of the type used in the automotive industry to protect the interior of door panels and will be described with particular reference thereto; however, the invention is capable of broader application and could be used for forming paint masks and similar shields or protective devices for either temporary or permanent installation.

In the commonly assigned U.S. Pat. No. 4,469,732 issued Sept. 4, 1984 to R. A. Isaksen, et al. there is disclosed a water deflector intended for use on the inner panel of a vehicle door to prevent water from entering the vehicle body or wetting the interior door trim. The deflector comprises a thin, flexible sheet of a suitable plastic such as polyethylene. A permanently plastic and permanently tacky pressure-sensitive adhesive is applied to selected areas of the sheet to permit attachment to the inner door panel.

The individual sheets with the adhesive suitably cured and release agents applied to the back side are stacked into aligned packets for shipping, storage, and subsequent use.

There has been an ongoing need for the flat deflectors to include bulges or pockets to allow them to adequately accommodate indoor ashtrays, radio speakers, and similar devices which extend inwardly of the door from the inner panel.

Prior attempts at providing suitable bulges in the sheets have been impractical and/or commercially unsuccessful. For example, conventional thermoforming can be used to form bulges if the thermoforming is performed prior to the adhesive application. However, after the bulges are formed, it is extremely difficult to apply the adhesive since the bulges interfere with the operation of the adhesive application and curing equipment. Attempts at forming the bulges after adhesive application and curing have generally resulted in contaminating the adhesive because of the handling and clamping associated with the thermoforming.

In addition to the above, even when the bulges have been successfully formed, they have interfered with stacking of the protectors. Moreover, the thermoforming has resulted in thinning the sheet material in the bulge area such that a critical portion of the bulge is sometimes too weak, and rupture or cut-through can occur.

The subject invention provides a structure and method of forming the same which overcome the above-noted problems and others in an economical and effective manner.

SUMMARY OF THE INVENTION

In accordance with the subject invention, a suitable pocket or bulge forming area is provided in a thin sheet of material and which area remains essentially in the plane of the sheet during handling and processing. The pocket or bulge-like area readily assumes a desired bulge-like conformation during final installation of the sheet onto an associated workpiece.

In particular, in accordance with one aspect of the invention, there is provided a shield device for use in protecting a surface which includes a generally flat and relatively thin sheet of flexible plastic material having a peripheral edge shaped to generally conform to the peripheral shape of the surface to be protected. Adhesive means is carried by the sheet at least in areas adjacent the peripheral edge for allowing the sheet to be joined to the surface to be protected. A predetermined area of the sheet is at least partially enclosed by a series of relatively small and closely spaced deformations formed to extend outwardly of the plane of the sheet a short distance. Such arrangement permits the predetermined area to be selectively deflected outwardly of the plane of the sheet to thereby form a bulge or pocket generally conforming to a protuberance or discontinuity on the surface.

In accordance with a more limited aspect of the invention, the deformations comprise corrugations formed continuously about the predetermined area. Preferably, the corrugations lie in parallel spaced relation to each other about the periphery of the predetermined area.

In accordance with another aspect of the invention, a method of forming a shield device for protecting a surface having a discontinuity is advantageously provided. The method includes providing a relatively flat sheet of thin, flexible plastic material having a peripheral size and shape generally corresponding to the size and shape of the surface, and determining the area of the sheet which will overlie the discontinuity when the sheet is placed in a protecting relationship on the surface. The next step comprises permanently forming a plurality of relatively closely spaced, small, and relatively shallow deformations in the sheet about the area determined to overlie the discontinuity for allowing the area to be selectively deflected laterally of the plane of the sheet to define a pocket-like portion for generally conforming to the discontinuity.

Desirably, the deformations comprise corrugations formed by thermoforming the sheet in a band to produce a thinning and an elongation of the sheet material in the area of the band while maintaining at least the central portion of the area determined to overlie the discontinuity generally planar and generally in the plane of the sheet located outside of the band.

The deformations or corrugations can be formed using either vacuum or pressure thermoforming techniques. Because of their short height, the sheets retain an essential flat configuration. Thus, the bulge or pocket forming area does not interfere with adhesive application, adhesive curing, die cutting, or stacking.

A large variety of bulge shapes and contours can be achieved by varying the amplitude and wavelength of the formed corrugations. Also, by properly locating the corrugations, portions of the sheet within the bulge forming area can retain their original thickness and strength. This permits such portions to better withstand contact and prevent cut-through in critical areas.

The principal advantage of the present invention is the provision of a sheet-type shield structure and method of making the same which allow bulge or pocket forming sections to be included at preselected areas without causing the structure to lose its essentially planar nature.

Another advantage resides in a shield structure of the type described which can be formed using conventional equipment and forming techniques.

A further advantage is found in the provision of a shield structure of the type described in which the bulge or pocket forming sections remain generally in the plane of the sheet until selectively deflected during installation of the shield structure.

The above and other advantages of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein:

FIG. 3 is a view similar to FIG. 2 but showing the water deflector or shield of FIG. 1 in position on the inner panel of a vehicle door;

FIG. 4 is an enlarged view of the circled area of FIG. 1;

FIG. 5 is an enlarged cross-sectional view taken on line 5—5 of FIG. 4; and,

FIG. 6 is a view showing how the circled portion of the shield can be manually deflected to its pocket or bulge forming position.

DESCRIPTION OF A PREFERRED EMBODIMENT

Figure 1:
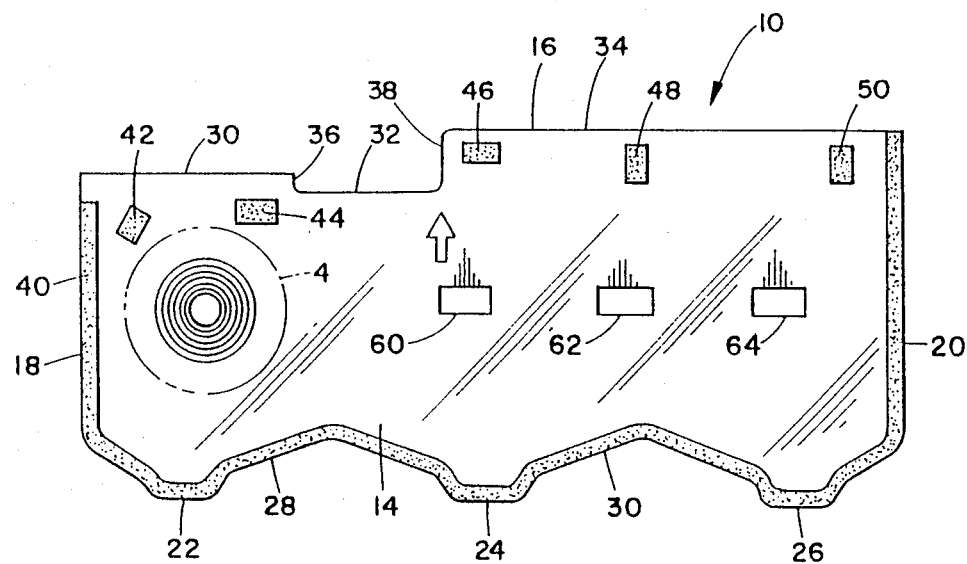
FIG. 1 is a plan view of a plastic sheet formed in accordance with the invention to function as a water deflector or shield in a vehicle door.
Figure 2:
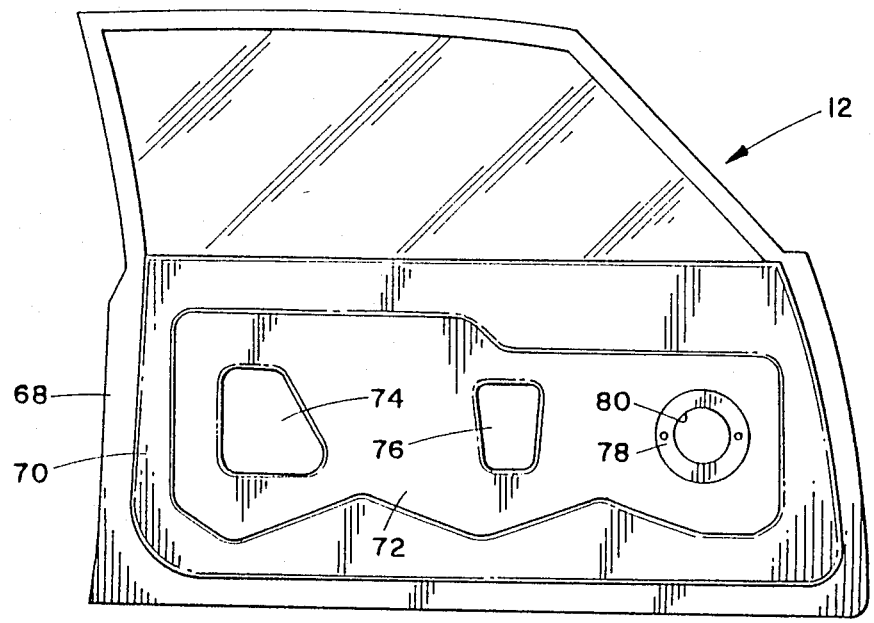
FIG. 2 is a diagrammatic elevational view of the inner panel of a vehicle door.

Referring now to the drawings wherein the showings are for purposes of illustrating a preferred embodiment of the invention only and not for limiting same, FIG. 1 shows the overall arrangement of a shield or protector device 10 which is specifically intended to be used as a water shield for application to the interior metal panel of a vehicle door such as door 12 illustrated in FIG. 2. While the invention will be described with specific reference to its preferred use as a water shield device for vehicle doors, it is to be appreciated that the invention has broader applications and could be equally adapted for use in paint masks and similar protective devices intended for either temporary or permanent application to some surface which is to be protected.

Referring again to FIG. 1, the shield or protective device 10 is illustrated as comprising a generally planar sheet 14 formed of a relatively thin synthetic plastic material. While those skilled in the art will recognize that a variety of types of synthetic plastic material may be used for the intended purposes, it has been found that the strength, flexibility, and durability of polyethylene makes it a preferred material for use in water deflectors and the like. In addition, although the sheet could be of a variety of thicknesses, it preferably has a thickness in the range of between approximately 5 to 10 mils.

The shield device 10 has an outer periphery 16 which is configured to generally conform to the outer periphery of the surface area to be protected. In the embodiment illustrated, the shield 10 includes generally spaced parallel side edges 18 and 20. The bottom edge is somewhat scallop-shaped and includes three aligned and spaced-apart bottom edge portions 22, 24, and 26 joined by inwardly extending edge portions 28 and 30. The top edge of shield 10 is defined by generally parallel and vertically offset edge portions 30, 32, and 34. Vertical edge portions 36 and 38, respectively, join top edge portions 30, 32 and 32, 34.

In order to allow the shield 10 to be attached to the surface to be protected, the sheet has a layer of adhesive applied to selected areas thereof. As will become apparent, this adhesive may be applied in either continuous or discontinuous patterns. In the subject embodiment, the adhesive is applied in a relatively narrow band 40 which extends continuously along the vertical side edges 18 and 20 and completely across the bottom edge. In addition, spaced-apart generally rectangular areas of adhesive are applied adjacent the top edge of the sheet as is shown, for example, at areas 42, 44, 46, 48, and 50.

Generally, the surface of the sheet to which the adhesive is to be applied is treated in a manner to modify the surface characteristics thereof for enhancing bonding of the adhesive to the sheet. As described in the prior, commonly assigned U.S. Pat. No. 4,469,732, the disclosure of which is incorporated herein by reference, it has been found that corona discharge treatment is preferred for this purpose.

During the manufacture of the shield 10, the adhesive is applied to the treated surface in a particular pattern desired by known techniques, and preferably has a relatively uniform thickness which is significantly less than the thickness of the sheet. Many different types of adhesives could obviously be used so long as they have substantially permanently tacky, pressure-sensitive characteristics.

Typically, the adhesive application is performed prior to cutting the sheet to have its final desired peripheral characteristics. Normally, while the sheets are in a blank form and prior to the cutting operation, they are processed as necessary and appropriate to at least partially cure the adhesive. This places the adhesive in its substantially permanently tacky and sticky condition for providing the required pressure-sensitive characteristics.

After curing, a plurality of the blanks are positioned in a stacked relationship and with their adhesive portions in registration with one another. Thereafter, the stacked blanks are die-cut to the desired peripheral configuration or shape. Simultaneously, any necessary internal openings or apertures such as openings 60, 62, and 64 can be cut through the blanks as necessary to provide access to predetermined areas on the associated surfaces to be protected.

As previously noted, the protector 10 in the subject embodiment is intended for use as a water deflector on a vehicle door 12 as shown in FIG. 2. The door 12 shown in FIG. 2 is somewhat typical and generally comprises an outer metal panel 68. An inner panel 70 is suitably secured to outer panel 68 such as by welding along the peripheral edge of panel 70. Typically, the panels are spaced to provide an internal chamber for accommodating various internal window operating mechanisms and the like. For this reason, the inner door panel is generally formed with an uneven shape or contour for accommodating and mounting various accessories or the like. In the embodiment shown, panel 70 has an inwardly dished area 72, and openings 74 and 76. The openings 74 and 76 provide access to the various internal door mechanisms and provide a means for mounting such mechanisms. In the embodiment illustrated, the inner panel 70 also includes a generally cylindrical portion 78 which extends upwardly from the bottom of depressed portion 72 and has its top surface lying at an elevation generally in the plane of the outer peripheral portion of the panel. An opening 80 is formed through the panel 70 centrally of portion 78. Openings such as this are often provided through the inner panel to permit installation of indoor ashtrays, radio speakers, and the like. In the subject embodiment, the opening 80 is designed to permit a speaker to be mounted to the inner panel with the cone and magnet of the speaker extending inwardly through the inner panel to the interior of the door.

The deflector 10 is, as previously mentioned, shaped and contoured to overlie the area of the interior panel to be protected. Specifically, FIG. 3 illustrates the protector or shield 20 in its installed position on the door. Generally, a completely flat protector can function adequately to provide the proper protection and conform to the desired contour. In certain instances, however, discontinuities in the surface make it highly desirable that the protector 10 have bulges or pockets formed therein to generally conform to the discontinuities and/or to provide space into which various door mechanisms or structures can extend. For example, in the embodiment under discussion, it would be highly desirable if the shield were provided with a protrusion or pocket to extend into the speaker mounting opening 80 so that the magnet and cone of the speaker would be protected without requiring separate installation of an independent protective device. That is, the protector 10 itself would have the capability of conforming to the magnet and cone of the speaker by deforming into the opening 80.

Many different approaches have been attempted to provide the necessary bulge or pocket formations in the protective devices. For example, a bulge or pocket can be formed by a conventional thermoforming operation performed on the sheet prior to the step of applying the adhesive. However, when thermoformed to a bulge or pocket configuration prior to applying the adhesive, the outwardly extending bulge portion interferes with application of the adhesive. The bulge can also create problems in curing the adhesive. When attempts are made to form the bulges or pockets after application of the adhesive, significant difficulties are encountered because the handling, clamping, and other processing steps associated with such forming result in contamination and loss of adhesion of the adhesive surfaces. In addition, the bulges interfere with effective stacking of the sheets for the cutting operations, and for storing and shipping.

In accordance with the subject invention, however, the desired pockets or bulges can be formed in a manner which allows them to remain generally flat and in the plane of the sheet until the sheets are installed. Specifically, the sheet is provided with a means to permit a pocket or bulge to be formed in the area adjacent the speaker opening 80 so that the speaker cone and magnet can be received in the opening without the necessity of cutting the sheet. As best seen in FIGS. 1, 3, and 4, the area or section of the sheet 16 which overlies the opening 80 when the sheet is in the installed position is enclosed by a series of relatively small and closely spaced deformations formed to extend outwardly a short distance from the plane of the sheet. The deformations could, as will become apparent, have a variety of different configurations. However, in accordance with the preferred embodiment, the deformations comprise relatively small and closely spaced, aligned corrugations 84 which extend generally in parallel relationship about the area or portion in which a pocket or bulge is desired.

As shown, the corrugations are formed as concentric circles about a center portion 86. By forming the corrugations, the effective length of the material between the outer edge 88 of the center portion 86 and the edge of the outermost corrugation 90 is increased substantially while permitting the planar center portion 86 to lie in the same plane as the surrounding undeformed portion of sheet 16. Additionally, because the deformations are in the form of relatively small corrugations 84 which extend outwardly of sheet 16 only a short distance, they do not interfere with subsequent printing, cutting, stacking, or storage of the sheet. However, when the sheet is in the process of being installed, manual pressure applied to the center section 86 can readily deflect the portion with the preformed deformations to the pocket or bulge conformation as shown in FIG. 6.

The corrugations can, of course, be formed at substantially any time during the process of forming the shield or protector. However, they are preferably formed prior to application of the adhesive so that the problems previously encountered with adhesive contamination are avoided. In addition, while the size and spacing of the corrugations could vary substantially, for a typical application, the total height H (FIG. 5) of the corrugations can be in the range of $\frac{1}{8}''$ for a plastic sheet having a thickness of 0.005''. Additionally, the corrugations can be formed such that the crests and roots thereof are disposed equal distances outwardly from the original plane of the sheet.

The deformations or corrugations can readily be formed using conventional thermoforming techniques of either the vacuum or pressure type. In addition, the method is readily adaptable to a variety of different plastic sheet and film materials. Moreover, it should be understood that, within limits, many different pocket shapes and contours can be achieved by varying the amplitude and wavelengths of the formed corrugations as the pattern progresses about the predetermined area. In addition, the corrugations can be continuous about the area as shown in the preferred embodiment, or extend only part way about the area, to provide differing resultant pocket configurations and shapes.

One important aspect of the invention is that non-formed areas can be included within the formed area. For example, the non-formed area 86 within the corrugations 84 retains its original full sheet thickness to withstand contact with associated equipment and resist inadvertent cut-through. It is clear that such non-formed areas can be included at any desired point or points within the formed area. Moreover, adhesive may be applied to the non-formed areas, e.g., area 86, for adhesive engagement with an associated component at the time of deflector installation.

In addition to the above, it should be appreciated that several different sizes and shapes of pocket forming sections could be provided across the shield 10 at desired locations. In addition, the inventive technique could be used not only with vehicle door water and dirt deflectors or shields, but also in the fabrication of paint masks. For example, the pocket forming sections could be suitably located within paint mask structures at positions to allow the masks to be positioned over surface protrusions or other surface discontinuities.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A shield device for use in protecting a surface comprising:
   (a) a generally flat and relatively thin sheet of flexible plastic material having a peripheral edge shaped to generally conform to the shape of the surface to be protected; and,
   (b) a predetermined area of said sheet being at least partially enclosed by a series of relatively small and closely spaced deformations formed to extend outwardly of the plane of the sheet a short distance for permitting said predetermined area to be selectively deflected laterally of the plane of the sheet to form a pocket for generally conforming to a discontinuity in said surface, said predetermined area being substantially in the plane of said sheet until an external force is applied to produce lateral deflection.

2. The shield device as defined in claim 1 wherein said deformations comprise corrugations formed continuously about said predetermined area.

3. The shield device as defined in claim 1 wherein each of said deformations extends from said sheet in a direction opposite to the next adjacent deformation.

4. The shield device as defined in claim 3 wherein said deformations comprise corrugations which lie in parallel generally about the periphery of said predetermined area.

5. The shield device as defined in claim 4 wherein said corrugations are continuous about said predetermined area.

6. The shield device as defined in claim 4 wherein said corrugations and said predetermined area comprise an integral continuation of said sheet.

7. The shield device as defined in claim 4 wherein the thickness of said corrugations is less than the thickness of said predetermined area.

8. The shield device as defined in claim 4 wherein said predetermined area is imperforate.

9. The shield device as defined in claim 4 wherein said corrugations are produced by thermoforming said sheet in a band about said predetermined area to produce a permanent thinning and elongation of the portion of the sheet constituting said band while maintaining said band generally in the plane of said sheet.

* * * * *